United States Patent
Ackley et al.

(10) Patent No.: US 9,952,356 B2
(45) Date of Patent: *Apr. 24, 2018

(54) AUTOFOCUS LENS SYSTEM

(71) Applicant: Hand Held Products, Inc., Fort Mill, SC (US)

(72) Inventors: H. Sprague Ackley, Seattle, WA (US); Alain Gillet, Galan (FR)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/440,357

(22) Filed: Feb. 23, 2017

(65) Prior Publication Data

US 2017/0160441 A1 Jun. 8, 2017

Related U.S. Application Data

(63) Continuation of application No. 14/979,818, filed on Dec. 28, 2015, now Pat. No. 9,581,809, which is a
(Continued)

(51) Int. Cl.
*G02B 9/00* (2006.01)
*G02B 3/00* (2006.01)
(Continued)

(52) U.S. Cl.
CPC .............. *G02B 3/0081* (2013.01); *G02B 7/09* (2013.01); *G02B 7/282* (2013.01); *G02B 7/32* (2013.01); *G02B 15/00* (2013.01); *G06K 7/1413* (2013.01)

(58) Field of Classification Search
CPC .................................................. G02B 15/173
See application file for complete search history.

(56) References Cited

U.S. PATENT DOCUMENTS 6,832,725 B2 12/2004 Gardiner et al.
7,128,266 B2 10/2006 Zhu et al.
(Continued)

FOREIGN PATENT DOCUMENTS

WO 2013163789 A1 11/2013
WO 2013173985 A1 11/2013
(Continued)

OTHER PUBLICATIONS poLight, "poLight; The Optical MEMS Company", Mar. 2012, 34 pages.
(Continued)

*Primary Examiner* — Christle I Marshall
(74) *Attorney, Agent, or Firm* — Additon, Higgins & Pendleton, P.A.

(57) ABSTRACT

An autofocus lens system includes no conventional moving parts and has excellent speed and low power consumption. The system includes a small electronically-controlled focusing-module lens. The focusing-module lens includes two adjustable polymeric surfaces (e.g., two adjustable-surface lenses in a back-to-back configuration). The curvature of the surfaces can be adjusted to change focus. The performance of the autofocus lens system is extended by adding a conventional first and second lens, or lens group, on either side of the focusing-module lens. What results is an autofocus lens system with excellent near field and far field performance.

20 Claims, 7 Drawing Sheets

Related U.S. Application Data continuation of application No. 14/264,173, filed on Apr. 29, 2014, now Pat. No. 9,224,022.

(51) Int. Cl.
  *G02B 7/32*   (2006.01)
  *G02B 15/00*  (2006.01)
  *G02B 7/28*   (2006.01)
  *G02B 7/09*   (2006.01)
  *G06K 7/14*   (2006.01)

(56) References Cited

U.S. PATENT DOCUMENTS

| | | |
|---|---|---|
| 7,159,783 B2 | 1/2007 | Walczyk et al. |
| 7,296,749 B2 | 11/2007 | Massieu |
| 7,413,127 B2 | 8/2008 | Ehrhart et al. |
| 7,726,575 B2 | 6/2010 | Wang et al. |
| 7,813,047 B2 | 10/2010 | Wang et al. |
| 8,045,280 B2 | 10/2011 | Henriksen et al. |
| 8,294,969 B2 | 10/2012 | Plesko |
| 8,305,691 B2 | 11/2012 | Havens et al. |
| 8,317,105 B2 | 11/2012 | Kotlarsky et al. |
| 8,322,622 B2 | 12/2012 | Liu |
| 8,366,002 B2 | 2/2013 | Wang et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,505,822 B2 | 8/2013 | Wang et al. |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,531,790 B2 | 9/2013 | Stang et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |

(56) References Cited

U.S. PATENT DOCUMENTS

| | | |
|---|---|---|
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 * | 12/2015 | Ackley ............. G06K 7/10811 |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 9,481,809 B2 | 11/2016 | Carney |
| 9,581,809 B2 * | 2/2017 | Ackley ............. G06K 7/10811 |
| 2007/0063048 A1 | 3/2007 | Havens et al. |
| 2008/0144185 A1 | 6/2008 | Wang et al. |
| 2008/0144186 A1 | 6/2008 | Feng et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0276491 A1 | 11/2010 | Havens et al. |
| 2010/0276492 A1 | 11/2010 | Wang et al. |
| 2010/0276493 A1 | 11/2010 | Havens et al. |
| 2011/0149409 A1 | 6/2011 | Haugholt et al. |
| 2011/0157675 A1 | 6/2011 | Heim et al. |
| 2011/0169999 A1 | 7/2011 | Grunow et al. |
| 2011/0202554 A1 | 8/2011 | Powilleit et al. |
| 2011/0304927 A1 | 12/2011 | Margolis |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0248195 A1 | 10/2012 | Feng et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0049683 A1 | 2/2014 | Guenter et al. |
| 2014/0061306 A1 | 3/2014 | Wu et al. |
| 2014/0063289 A1 | 3/2014 | Hussey et al. |

(56) References Cited

U.S. PATENT DOCUMENTS

| | | |
|---|---|---|
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104696 A1 | 4/2014 | Moreau et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0194750 A1 | 7/2014 | Lee et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |

(56) References Cited

U.S. PATENT DOCUMENTS

| | | | |
|---|---|---|---|
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0131894 A1 | 5/2016 | Ackley |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

Intermec, "EX25 Near/Far 2D Imager Engine 3rd Generation" Website Product Profile and Specifications, Copyright 2013 Honeywell Internation Inc. 61187-D Dec. 2013, 2 pages.

Intermec, "The 2D Revolution; How evolving business needs and improved technology are driving explosive growth in two-dimensional bar coding", White Paper, Copyright 2007 Intermec Technologies Corporation 611838-01A Jun. 2007, 7 pages.

Intermec, "Guide to Scanning Technologies", White Paper, Copyright 2007 Intermec Technologies Corporation 609107-010 Mar. 2007, 8 pages.

Intermec, "Imaging Moves into the Mainstream; Why 2D Imagers are Surpassing Laser Scanners for Bar Code Application", White Paper, Copyright 2011 Intermec Technologies Corporation 612138-02A Jul. 2011, 7 pages.

Jon H. Ulvensoen, poLight AS, "New Micro technology provides the functionality to mobile phone cameras", All rights reserved poLight AS, www.polight.com, 2011, 20 pages.

Extended Search report in related EP Application No. 15163293.2, dated Sep. 18, 2015, 7 pages.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Vekatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al); 40 pages.

U.S. Appl. No. 14/740,320 for Tactile Switch For a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

Office Action in related European Application No. 15163293.2 dated Jun. 22, 2017, pp. 1-5 [all refernces previously cited.].

\* cited by examiner

AUTOFOCUS LENS SYSTEM

CROSS-REFERENCE TO RELATED APPLICATION

The present application claims the benefit of U.S. patent application Ser. No. 14/979,818 for an Autofocus Lens System filed Dec. 28, 2015 (and published May 12, 2016 as U.S. Patent Publication No. 2016/0131894), now U.S. Pat. No. 9,581,809, which claims the benefit of U.S. patent application Ser. No. 14/264,173 for an Autofocus Lens System for Indicia Readers filed Apr. 29, 2014 (and published Oct. 29, 2015 as U.S. Patent Publication No. 2015/0310243), now U.S. Pat. No. 9,224,022. Each of the foregoing patent applications, patent publications, and patents is hereby incorporated by reference in its entirety.

FIELD OF THE INVENTION

The present invention relates to indicia readers and, more particularly, to an autofocus optical system that extends the range of distances at which indicia may be read.

BACKGROUND

Indicia readers (e.g., barcode scanners, OCR scanners) fall into two main classes based on their barcode-reading technology, namely (i) linear scanners (e.g., laser scanners, 1D imagers) and (ii) 2D scanners (e.g., 2D imagers, page scanners).

Laser scanners use fast moving mirrors to sweep a laser beam across a linear barcode. The bars and spaces of the barcode are recognized based on their respective reflectivity. In other words, the light areas and dark areas of the barcode reflect light back toward the scanner differently. This difference can be sensed by the scanner's photo-detector (e.g., photodiode) and converted into an electronic signal suitable for decoding.

Imaging scanners were developed to read advanced codes by adapting technology used in digital cameras. Imaging scanners take a picture of the entire barcode, and a processor running image processing algorithms recognizes and decodes the barcode. This digital approach overcomes many of the laser scanner's limitations.

Imaging scanners are more reliable than laser scanners, which use fast-moving parts. Imaging scanners can be configured to process all barcodes within a field of view and do not require separate scans for each barcode. Sophisticated decoding algorithms eliminate the need to align the imaging scanner with the barcode. Imaging scanners can also scan poor quality or damaged barcodes faster and more reliably than laser scanners. Further, the imaging scanner is more versatile and can be configured to address new codes or new modes of operation, such as document-capture. In view of these advantages, many users prefer the imaging scanner. The imaging scanner, however, lacks the extended scan range associated with laser scanners.

Extended scan ranges are important in warehouse environments, where barcoded containers may be stacked on high shelves. Operators may be limited in their access to barcodes and must scan over a range of distances. In these situations, scanning ranges can be 10 centimeters to 10 meters. This multi-order-of-magnitude range requirement places stringent demands on the imaging scanner.

The range of imaging scanners is limited by the scanner's imaging optics (e.g., lens). The quality of a barcode image is crucial for proper scans. Images that are unfocused images can render a barcode unreadable.

The range of distances over which a barcode can be decoded is known as the working-distance range. In fixed-lens systems (i.e., no moving parts), this working-distance range is the distance between the nearest focused objects and the farthest focused objects within the field of view (i.e., depth of field). The depth of field is related to the lens's f-number. A lens with a high f-number has a large depth of field. High f-number lenses, however, collect less light. Imaging scanners must collect sufficient light to prevent noisy images. These scanners, therefore, need a lens with both a low f-number and the ability to produce sharp images over a wide range of working distances. Fixed lenses, therefore, are not used for imaging scanners intended for extended range applications (e.g., warehouses).

Autofocus (i.e., AF) lenses may be used in imaging scanners that need both near and far scanning capabilities. Typically, focus is achieved in an autofocus lens by mechanically moving the lens. These mechanically-tuned autofocus lenses provide range to imaging scanners but also have some limitations.

The moving parts in mechanical autofocus lens systems may have reliability issues. The mechanical autofocus lens systems can be bulky because of the extra components required for motion (e.g., actuators, tracks, and linkages). These motion components also consume power at a rate that may limit their compatibility with battery-powered scanners. The mechanical motion of the lens or lenses can be slow and may hinder their use in applications that require fast focus (e.g., scanning in moving environments). Finally, the cost of these mechanical autofocus lens systems can be high because of the number and precision of the required mechanical parts.

Therefore, a need exists for an imaging-scanner autofocus lens system that has (i) a large focus range, (ii) a small size, (iii) low power consumption, and (iv) reduced mechanical complexity.

SUMMARY

Accordingly, in one aspect, the present invention embraces an autofocus lens system for an imaging scanner. The autofocus lens system uses a first lens (or lens group including a plurality of lenses), a second lens (or lens group including a plurality of lenses), and a focusing-module lens to focus a barcode onto an image sensor. The first lens is fixedly positioned along an optical axis. The second lens is fixedly positioned along the optical axis. The focusing-module lens is fixedly positioned along the optical axis between the first and second lenses. The lenses together create a real image of indicia. The focusing-module lens is used to change the focus of the autofocus lens system. Focus is adjusted by adjusting the optical power of the focusing-module lens. The optical power of the focusing-module lens is controlled by electronically adjusting the curvature of two adjustable surfaces.

In an exemplary embodiment, the autofocus lens system has a focusing-module lens with a clear aperture diameter that is smaller than the diameter of either the first lens or the second lens. The focusing-module lens defines the aperture stop for the autofocus lens system.

In another exemplary embodiment, this focusing-module lens has a diameter between 1.3 and 1.7 millimeters (e.g., about 1.5 millimeters).

In another exemplary embodiment, the autofocus lens system has a working distance of 10 centimeters or greater.

In another exemplary embodiment, the autofocus lens system has a response time of 2 milliseconds or less (e.g., less than about 1 millisecond).

In another exemplary embodiment, the autofocus lens system consumes 20 milliwatts of power or less.

In another exemplary embodiment, the autofocus lens system has an f-number of 7 or less.

In another exemplary embodiment, the focusing-module lens includes two adjustable-surface lenses positioned in close proximity to one another.

In still another exemplary embodiment, the focusing-module lens may include two contiguous adjustable surfaces. Here, the focusing-module lens includes (i) a first transparent deformable membrane having a ring-shaped piezoelectric film contiguously positioned on the first transparent deformable membrane's outer surface, (ii) a second transparent deformable membrane having a ring-shaped piezoelectric film contiguously positioned on the second transparent deformable membrane's outer surface, and (iii) a flexible polymer contiguously positioned between the first transparent deformable membrane and the second transparent deformable membrane. In this way, the flexible polymer is in contact with the inner surfaces of both the first transparent deformable membrane and the second transparent deformable membrane. The transparent deformable membrane can be fabricated from glass, quartz, sapphire or other semi-rigid transparent material. The two adjustable surfaces of the focusing-module lens may, in some embodiments, be electronically controlled independently.

In another aspect, the present invention embraces an active autofocus system for an imaging scanner including the foregoing autofocus lens system. In this active autofocus system, a range finder senses the range of a barcode through transmitted and received radiation and creates a range signal representing the sensed range. A processor generates a control signal based on the comparison of the range signal with a lookup table stored in memory. The lookup table contains focus settings associated with various range-signal values. A controller responds to the control signal by creating electronic autofocus signals to adjust the autofocus lens system to achieve focus of a real image of a 1D or 2D barcode.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
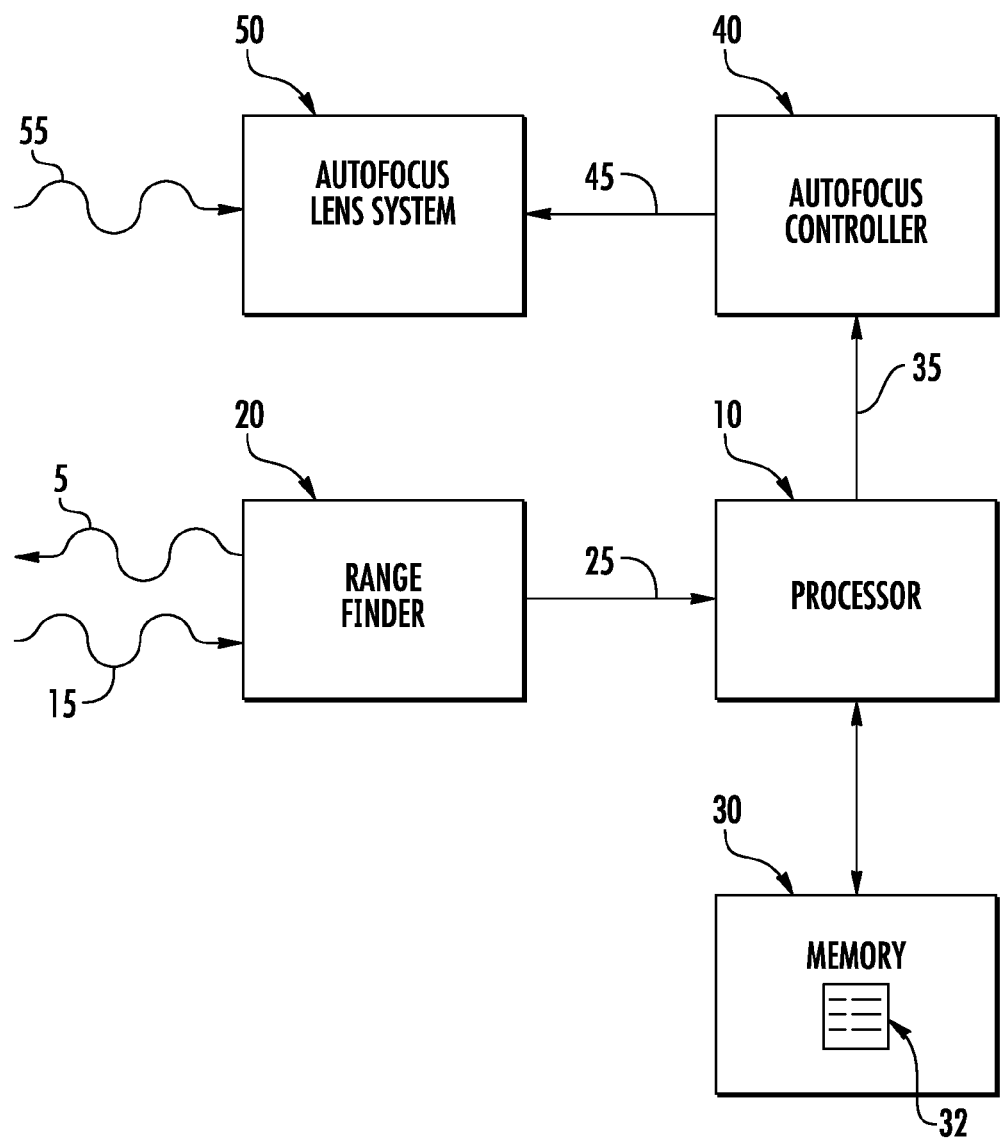
FIG. 1 schematically depicts a block diagram of an active autofocus system.

The present invention embraces an autofocus lens system for an imaging scanner that extends the range of distances over which barcodes may be read. In this regard, an exemplary autofocus lens system for an imaging scanner includes (i) a first lens (e.g., first positive lens), fixedly positioned along an optical axis, (ii) a second lens (e.g., second positive lens) for creating a real image of a barcode, the second lens fixedly positioned along the optical axis, and (iii) and a focusing-module lens fixedly positioned along the optical axis between the first lens and the second lens, the focusing-module lens formed from two adjustable surfaces, wherein the optical power of the adjustable surfaces is controlled electronically to achieve focus.

Imaging scanners require good images to properly decode barcodes. The image sensors used in these devices deliver high-quality images only when the light impinging on the sensor (i) is focused and (ii) has an intensity above the sensor's noise level (i.e., a high signal-to-noise ratio).

To achieve high signal-to-noise ratio (SNR) images, the lens of an imaging scanner should gather light efficiently (i.e., have a high throughput). The entrance pupil is the image of the lens system's aperture-stop as seen through the front lens and is an indicator of the throughput. A large entrance pupil implies that the lens system will have high throughput. Long range scans are especially susceptible to low SNR images. This is due to path loss. The light reflected from the barcode spreads out over long ranges and less is captured by the scanner imaging lens. Illumination sources may help to improve the signal to noise ratio (i.e., SNR) of images, but a high throughput imaging lens is still extremely important.

Imaging scanners used in diverse environments (e.g., warehouses) should read barcodes at various ranges in both the near field and far field (e.g., 10 centimeters to 10 meters). In other words, the imaging scanner's lens must be able to create sharp barcode images over a wide range of working distances.

Fixed-focus lenses, with no focusing motion, are not used in imaging scanners requiring wide scanning ranges. These lenses typically have low throughput and may not be able to focus on a barcode that is close to the scanner.

Lenses with focusing motion can extend the scanner's working-distance range. The focusing motion moves the lens to a point where the light rays from a barcode converge onto the image sensor and produce a sharp real image. While this focusing movement can be accomplished manually, it is more practical for scanners to use an automatic-focus (i.e., autofocus) system.

Autofocus systems use (i) optimal focus information and (ii) a positioner (e.g., an actuator or piezoelectric) to positioning the real image. A passive autofocus system might use a processor running image-processing algorithms to determine the focus quality. The processor uses this information to send signals to actuators that position the lens. Alternatively, an active autofocus system uses a range finder to ascertain the distance between the object and the front lens of the system (i.e., the working distance). This range information can then be used to adjust the lens position for optimal focus. Because of its simplicity, the active autofocus scheme is well suited for imaging scanners.

The range finder in an active autofocus system can use one or more sensors to create a range signal. A processor running a process can compare the range signal with a stored lookup table to generate a corresponding control signal. The control signal can be interpreted by control electronics (e.g., a controller) to drive the lens system's positioning devices.

A block diagram of an active autofocus system is shown in FIG. 1. Here, a range-finder 20 senses the range (i.e., working distance) of a barcode through some transmitted radiation 5 and received radiation 15 (e.g., optical signals). The range finder 20 creates a range signal 25 and then sends this range signal 25 to a processor 10. The processor 10 runs an algorithm to compare the value of the range signal 25 with a lookup table 32 stored in memory 30. The lookup table 32 contains focus settings for various range signals 25. Once the focus settings corresponding to the measured range are determined, the processor 10 sends a control signal 35 to the autofocus controller 40. Based on this signal, the autofocus controller 40 sends electronic autofocus signals 45 to the autofocus lens system 50. The autofocus signals 45 cause the autofocus lens system 50 to change the imaging system's focus. When the adjustment of the autofocus lens system 50 is complete, the light from the barcode 55 is well focused onto the imaging scanner's image sensor.

Autofocus functionality relies on an adjustable lens parameter to focus the barcode. In traditional autofocus systems, focus is achieved by changing the position of a lens (or lenses forming a lens group) in relation to the image sensor. The autofocus signals 45 drive motors or actuators that move the lens (or lenses). In other words, the focus is controlled mechanically by changing the position of a lens or a lens group.

Mechanical autofocus systems can be bulky and slow for imaging scanner applications. A typical mechanical autofocus system can take 60 milliseconds to reach focus. Actuators in these systems can also draw a relatively large amount of power. Typical systems may draw around 450 milliwatts, which reduces battery life.

Focus can be adjustable non-mechanically as well. Lens curvature (i.e., lens power) may be changed to adjust focus. Lenses made from an adjustable surface (i.e., adjustable-surface lenses) can be used in autofocus lens systems for imaging scanners. Adjustable-surface lenses are compact, fast, reliable, cost-effective, and energy efficient.

Figure 2:
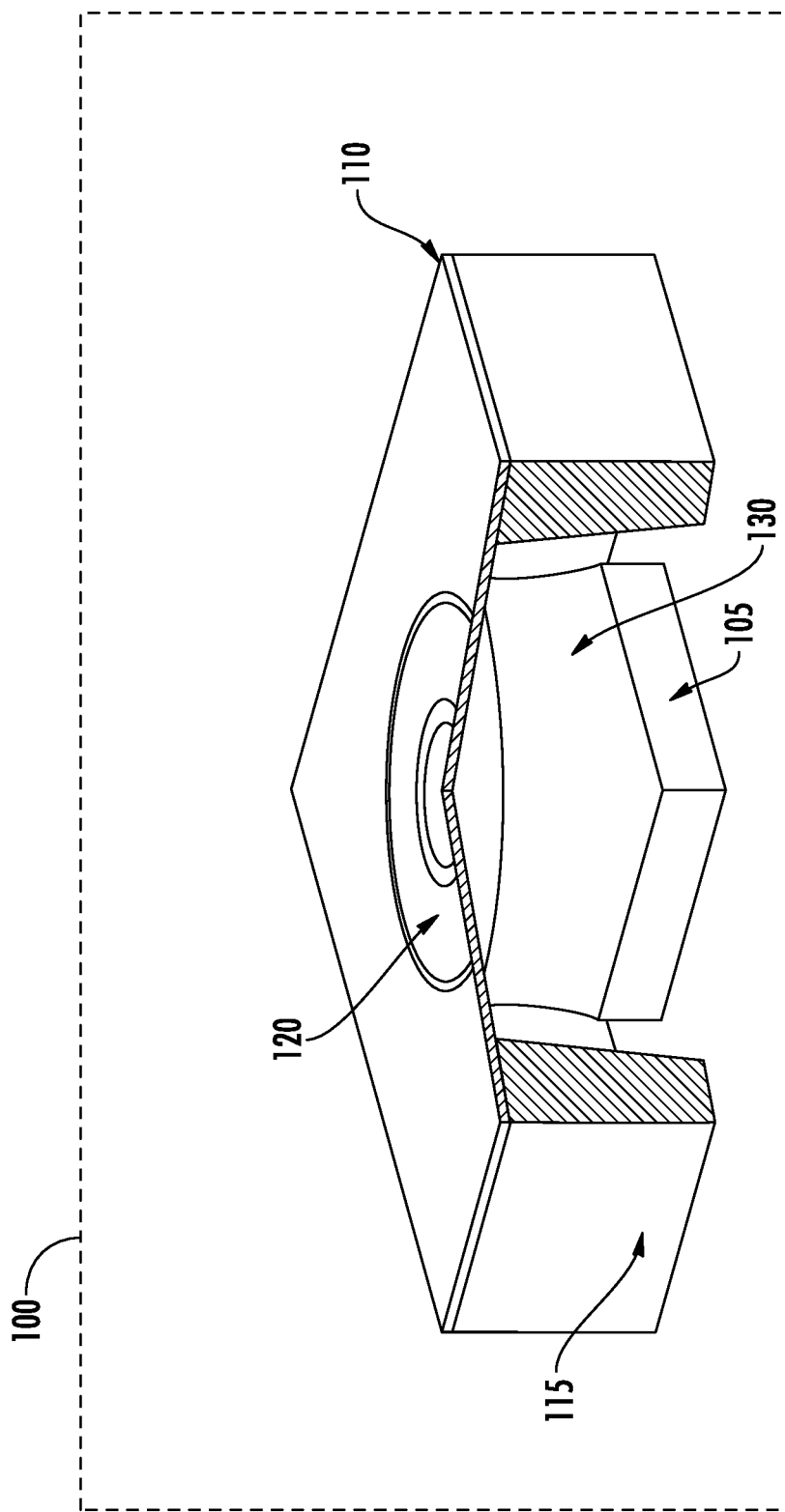
FIG. 2 graphically depicts a perspective view of a cut-away layout of an adjustable-surface lens.

A perspective half-section view of a lens made from a single adjustable surface is shown in FIG. 2. The glass support 105 is a support element made of a transparent rigid material such as glass. The top element is a thin glass membrane 110, including an actuating element, such as a ring-shaped piezoelectric film 120. The glass membrane is supported on its edges by a silicon support 115 made from some MEMS (i.e., micro-electro-mechanical systems) manufacturing technology. Sandwiched between the glass support 105 and the glass membrane 110 is a flexible transparent polymeric material 130.

Figure 3:
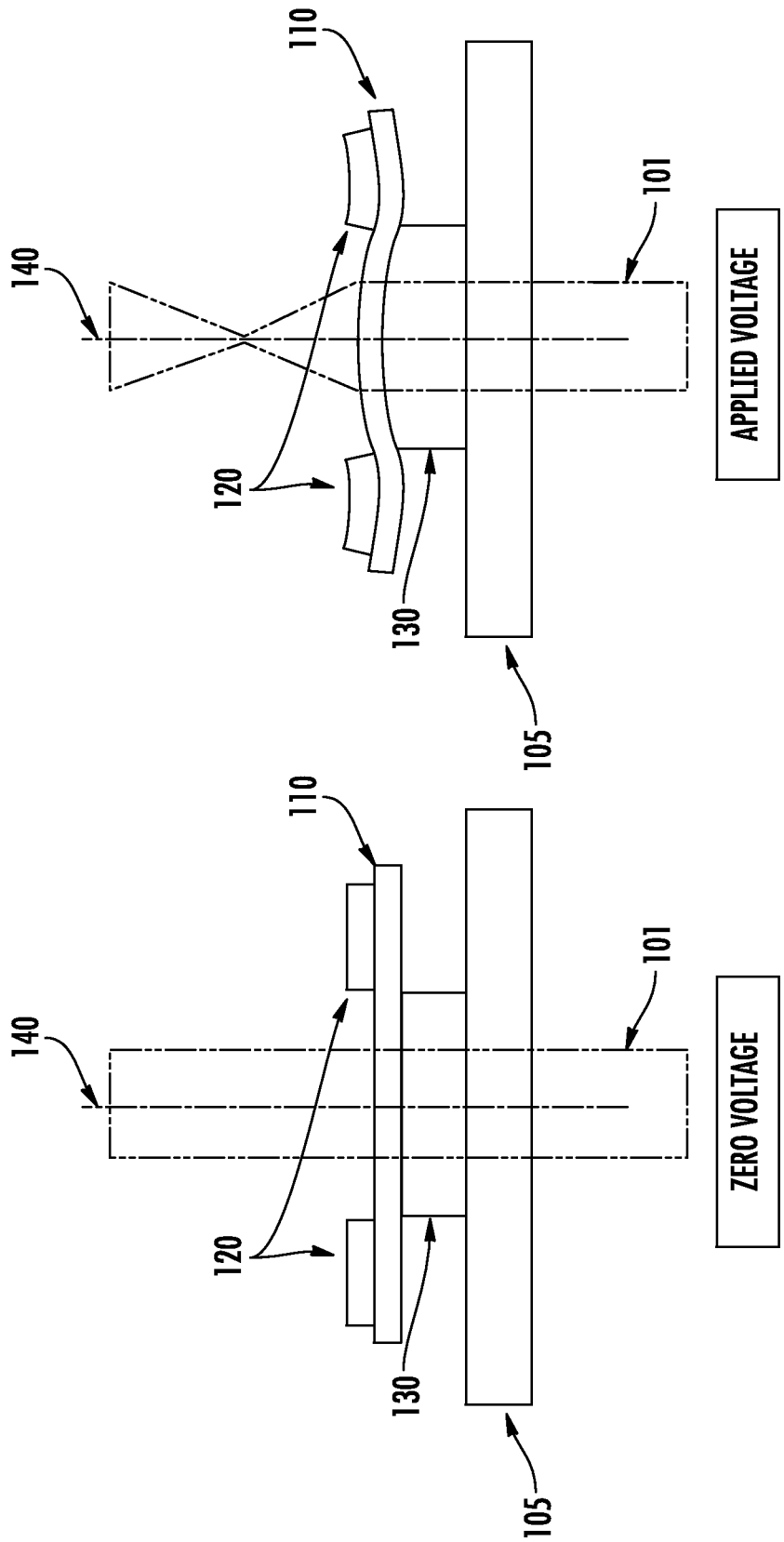
FIG. 3a graphically depicts a side-view cross-section of an adjustable-surface lens with no voltage applied (i.e., the "off" state).
FIG. 3b graphically depicts a side-view cross-section of an adjustable-surface lens with a voltage applied (i.e., the "on" state).

The adjustable-surface lens 100 relies on a change in the polymeric surface's curvature as a result of an applied voltage. A side-view cross-section of the adjustable-surface lens 100 and its off/on operation are shown in FIG. 3a and FIG. 3b respectively. As depicted in FIG. 3a, when no voltage is applied to the ring-shaped piezoelectric film 120, the light beam 101 passes through the clear polymer 130 with no alteration (i.e., zero optical power). On the other hand, as shown in FIG. 3b, when a voltage is applied to the piezoelectric film 120, the shape of the glass membrane 110 and the contiguous polymer 130 are curved (e.g., spherically or near spherically). When a voltage is applied to the adjustable-surface lens 100, the light beam 101 is focused to a point behind the lens.

Focusing the small adjustable-surface lens 100 is achieved by changing the shape of the adjustable surface. This change is caused by a mechanical strain exerted by the ring-shaped piezoelectric film (i.e., piezo-ring) 120 because of an applied voltage. This strain alters the shape of the glass membrane 110, and, more importantly, also changes the shape of the flexible polymer 130 that is contiguous to this layer. In this way, the adjustable surface's optical power is controlled, and the position of the focus is adjusted.

The adjustable-surface lens 100 is well suited for imaging scanners. The adjustable-surface lens 100 can be fabricated using advanced semiconductor manufacturing techniques (i.e., MEMS technology), and therefore can be very cost effective. The adjustable-surface lens 100 is small and can be conveniently integrated within an imaging scanner. Adjusting the optical surface is very fast (e.g., 2 milliseconds) and draws very little power (e.g., 20 milliwatts), allowing for fast acquisition and long-life battery operation.

The adjustable-surface lens 100 has some limitations that must be accommodated for in order to use this component for imaging scanner applications. The adjustable-surface lens 100 has a very small clear aperture (e.g., 1.55 millimeters) and leads to a high f-number with a long focal length (e.g., f/10). The range of optical powers is limited (e.g., 0 to +10 diopters), resulting in a working distance range (e.g., 10 centimeters to infinity).

Figure 4:
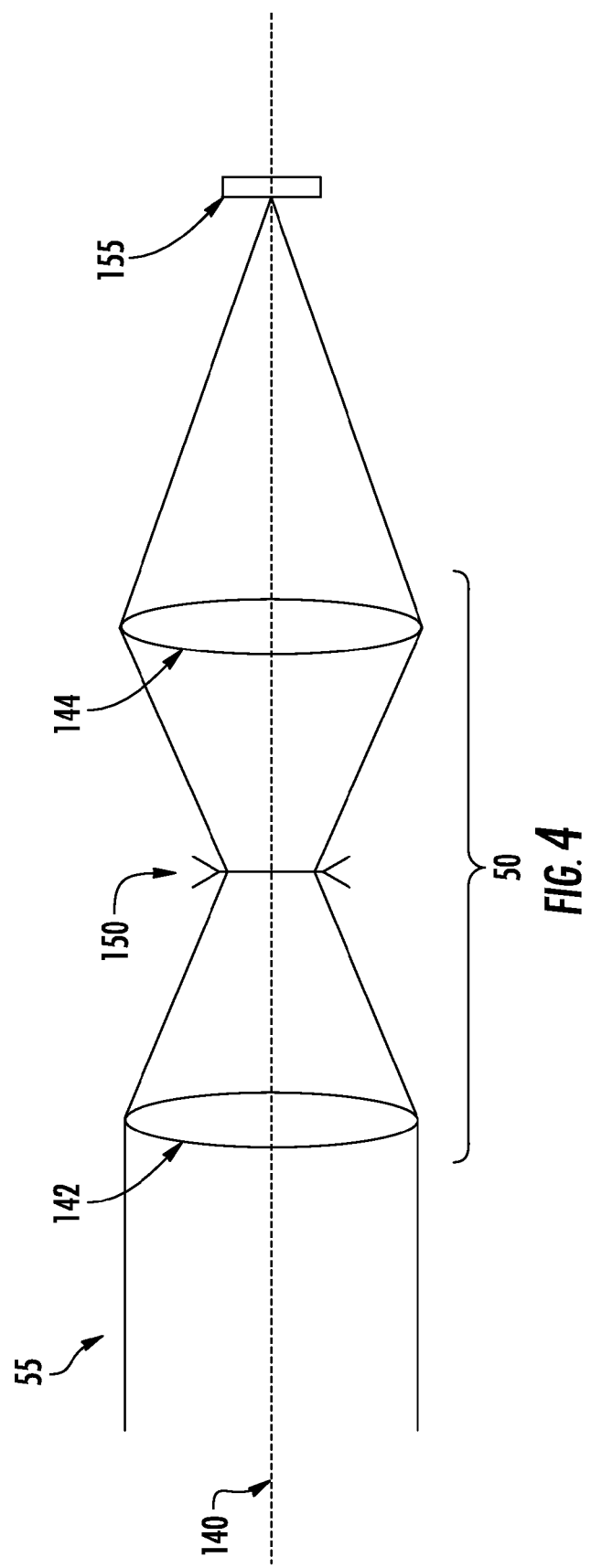
FIG. 4 schematically depicts an embodiment of an autofocus lens system.

To overcome the limitation of the adjustable-surface lens's small aperture, other lenses may be added along the optical axis 140. An embodiment of this autofocus lens system is shown in FIG. 4. As depicted, the light from a barcode 55 is focused onto the image sensor 155 by three ideal lenses that help to form the autofocus lens system 50. A first lens 142 and a second lens 144, both with positive power, are positioned on either side of the adjustable-surface lens 100, which has negative power. Both the first and second lenses have apertures larger than the aperture stop of the system (i.e., the adjustable-surface lens 100). The first lens 142 forms a large entrance pupil by magnifying the aperture stop. The larger entrance pupil improves the lens system's throughput. The second lens 144 forms a real image of the object (e.g., barcode) onto the image sensor 155. A focusing-module lens 150 uses adjustable optical power to adjust the focus position along the optical axis 140 so that, regardless of the barcode distance, the focus position coincides with the image sensor 155.

To achieve focus for all ranges, the focusing-module lens 150 must be able to adjust its optical power sufficiently. The three-lens configuration shown in FIG. 4 has excellent throughput but lacks performance when a single adjustable-surface lens 100 is used. In other words, when a single adjustable-surface lens 100 is used, the autofocus lens system 50 cannot accommodate close scans (e.g., 10-centimeter scans). The pupil magnification, while needed for throughput, reduces the adjustable-surface lens's ability to focus on objects in the near field. To extend the focus range requires optical power beyond what a single adjustable-surface lens 100 can provide.

To increase the effective optical power, a focusing-module lens 150 may be formed using two adjustable optical surfaces placed in close proximity. The optical powers of the two adjustable surfaces are additive so the overall power of the focusing-module lens 150 may be doubled.

Figure 5:
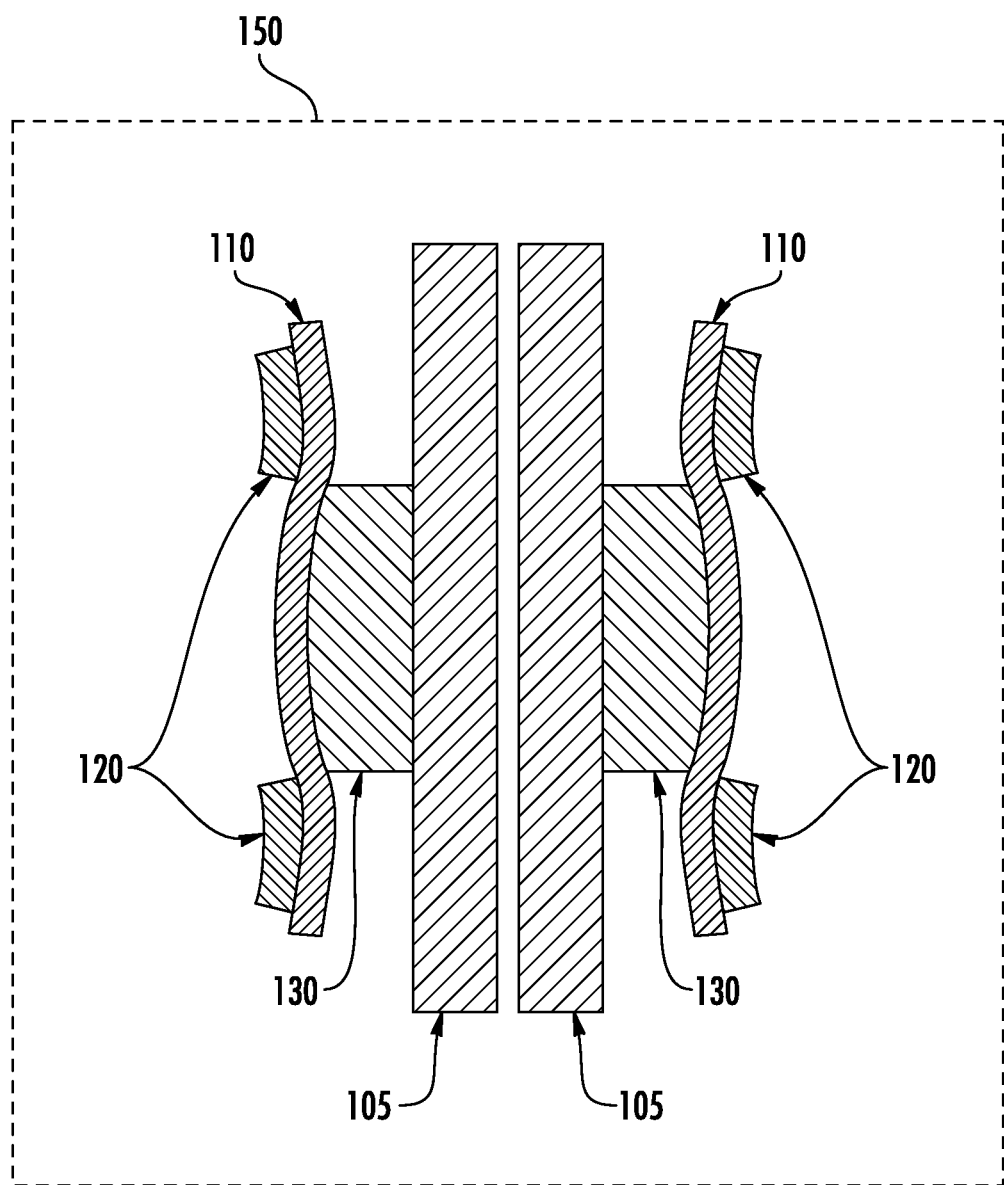
FIG. 5 graphically depicts a first embodiment of a focusing-module lens with two adjustable-surface lenses in close proximity.

One exemplary embodiment of the two adjustable surface focusing-module lens 150 uses two adjustable-surface lenses 100 placed in close proximity (e.g., back-to-back) as shown in FIG. 5. The back-to-back adjustable-surface lenses form an effective lens with two adjustable polymeric surfaces to control the optical power (i.e., instead of just one lens). An advantage of this embodiment is that the adjustable-surfaces lenses 100 have already been reduced to practice and are commercially available, such as from poLight AS. In this regard, this application incorporates entirely by reference U.S. Pat. No. 8,045,280 (poLight AS).

Figure 6:
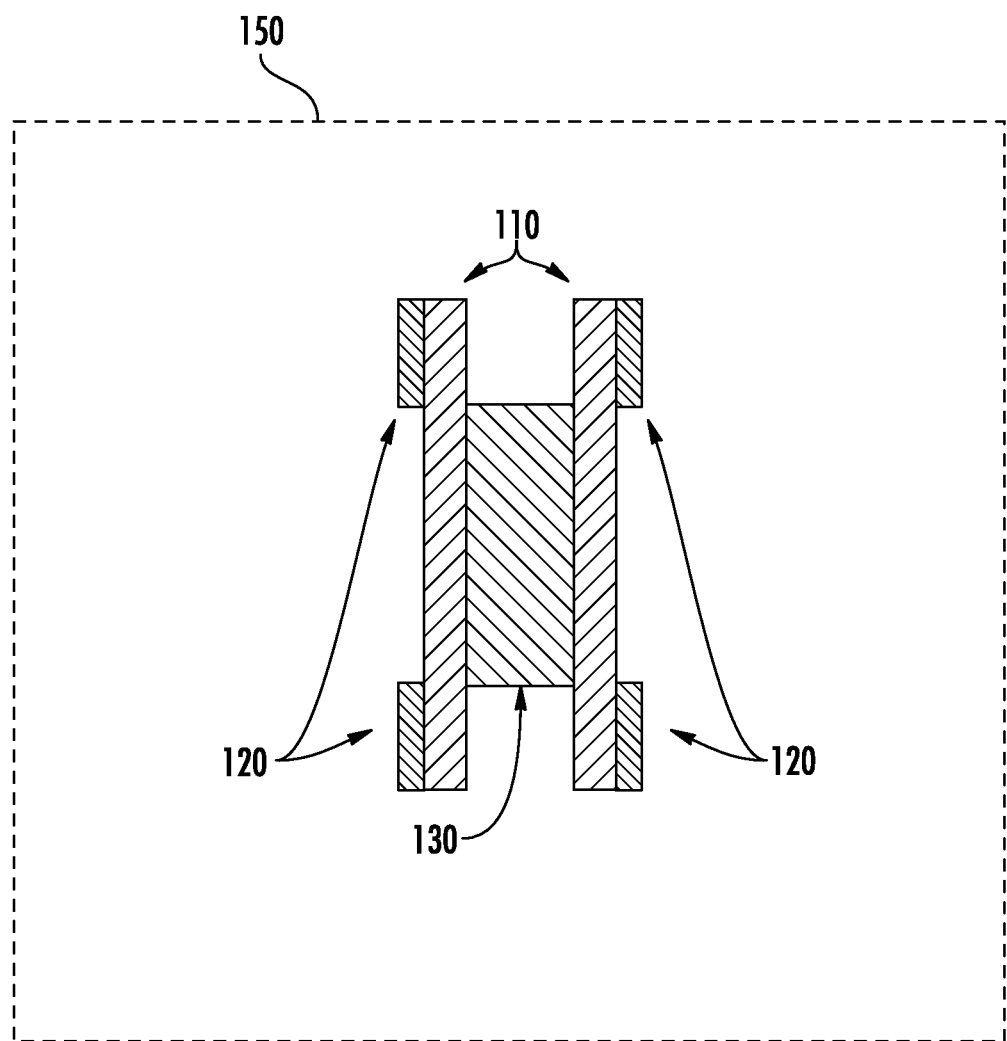
FIG. 6 graphically depicts a second embodiment of a focusing-module lens.

Alternatively, a focusing-module lens 150 with two adjustable surfaces integrated into a single device can be utilized. As shown in FIG. 6, this alternative embodiment includes a flexible polymer 130 sandwiched between two transparent deformable membranes 110, each with its own ring-shaped piezoelectric film 120. Each transparent deformable membrane 110 can be fabricated from glass, quartz, and/or sapphire). This embodiment would allow for the same focusing power as the first embodiment and would also offer more simplicity and compactness.

In both embodiments, the electronically controlled optical powers on the adjustable polymeric surfaces summate, thereby forming a focusing-module lens 150 with a larger available optical power range (e.g., 0-20 diopters). When this two-surface focusing-module lens 150 is used in the three lens configuration shown in FIG. 4, the higher optical power range and the pupil magnification combine to form an autofocus lens system 50 with excellent focus range and small f-number. Such an autofocus lens system is well suited for imaging scanner applications.

Figure 7:
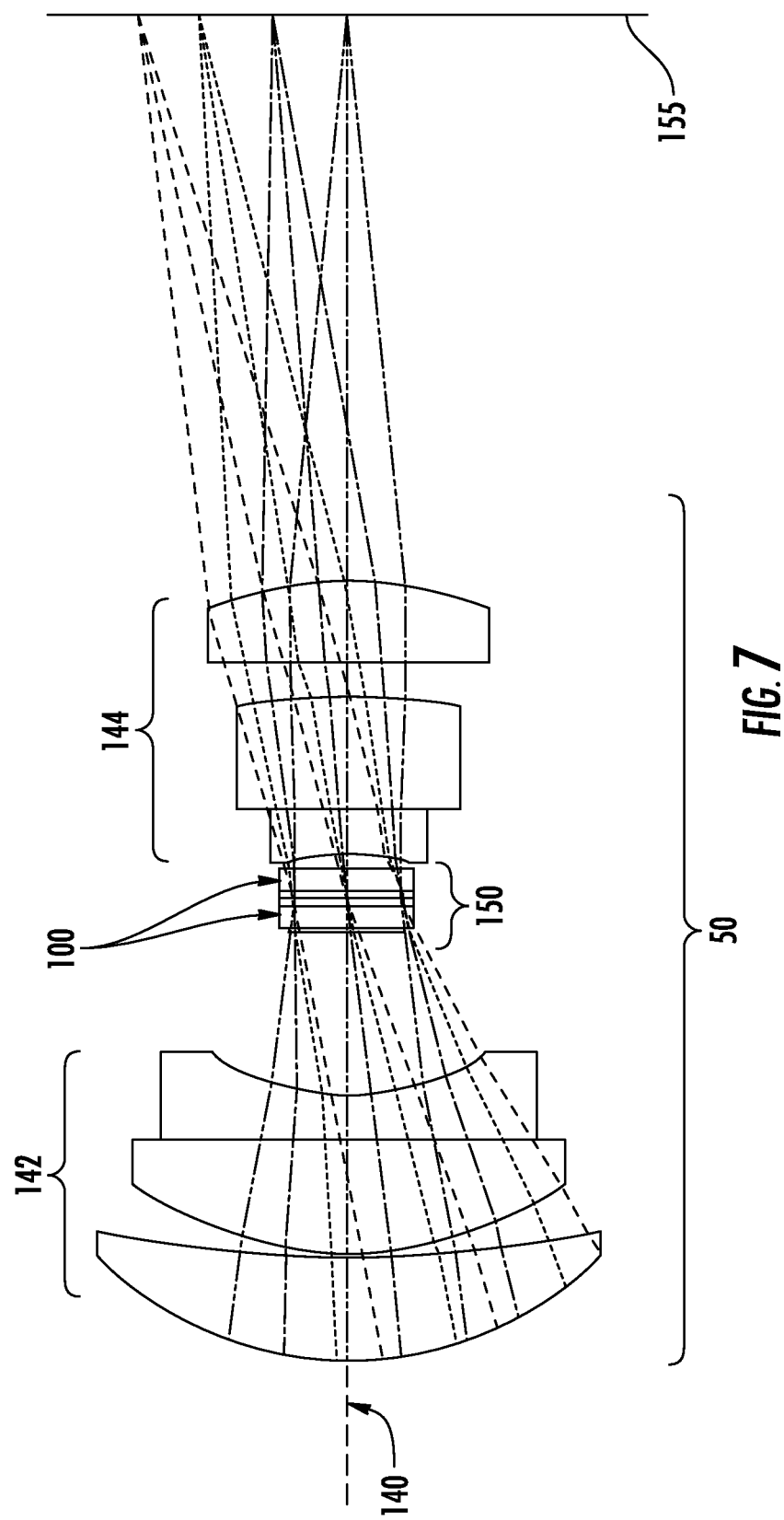
FIG. 7 schematically depicts an exemplary embodiment of an autofocus lens system.

A practical embodiment of the autofocus lens system 50 is shown in FIG. 7. Here, two positive lens groups 142, 144, including a plurality of lenses, are fixedly positioned along the optical axis 140. A focusing-module lens 150, which includes two adjustable-surface lenses 100, is fixed between the two lens groups. No moving parts along the optical axis are required for focusing. A voltage applied to each adjustable surface's ring-shaped piezoelectric film 120 is enough to focus the barcode onto the image sensor 155.

The resulting autofocus lens system 50 is smaller, faster, consumes less power, and is more cost effective than other mechanically-tuned autofocus lenses for imaging scanners. The autofocus lens system 50, based on the architecture described here, can focus on indicia both in the near-field (e.g., 10 centimeters) and far-field (e.g., 10 meters or greater).

The possible applications for this auto-focus lens system 50 need not be limited to imaging scanners. Any application requiring a narrow field of view (e.g., about 10 degrees to 15 degrees) and a wide focus range (e.g., 10 centimeters to infinity) could benefit from this lens configuration. For example, applications like license-plate imagers or long range facial-recognition would be suitable for this type of lens.

This application incorporates entirely by reference the commonly assigned U.S. Pat. No. 7,296,749 for Autofocus Barcode Scanner and the Like Employing Micro-Fluidic Lens; U.S. Pat. No. 8,328,099 for Auto-focusing Method for an Automatic Data Collection Device, such as an Image Acquisition Device; U.S. Pat. No. 8,245,936 for Dynamic Focus Calibration, such as Dynamic Focus Calibration using an Open-Loop System in a Bar Code Scanner; and U.S. Pat. No. 8,531,790 for Linear Actuator Assemblies and Methods of Making the Same.

To supplement the present disclosure, this application incorporates entirely by reference the following commonly assigned patents, patent application publications, and patent applications:
U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,819; 8,544,737; 8,548,242; 8,548,420; 8,550,335; 8,550,354; 8,550,357; 8,556,174; 8,556,176; 8,556,177; 8,559,767; 8,559,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,593,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282;
International Publication No. 2013/163789;
International Publication No. 2013/173985;
International Publication No. 2014/019130;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0169999;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193407;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292474;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0306734;
U.S. Patent Application Publication No. 2013/0307964;
U.S. Patent Application Publication No. 2013/0313324;
U.S. Patent Application Publication No. 2013/0313325;
U.S. Patent Application Publication No. 2013/0313326;
U.S. Patent Application Publication No. 2013/0327834;
U.S. Patent Application Publication No. 2013/0341399;
U.S. Patent Application Publication No. 2013/0342717;
U.S. Patent Application Publication No. 2014/0001267;

U.S. Patent Application Publication No. 2014/0002828;
U.S. Patent Application Publication No. 2014/0008430;
U.S. Patent Application Publication No. 2014/0008439;
U.S. Patent Application Publication No. 2014/0021256;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0061307;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz);
U.S. patent application Ser. No. 13/736,139 for an Electronic Device Enclosure, filed Jan. 8, 2013 (Chaney);
U.S. patent application Ser. No. 13/750,304 for Measuring Object Dimensions Using Mobile Computer, filed Jan. 25, 2013;
U.S. patent application Ser. No. 13/771,508 for an Optical Redirection Adapter, filed Feb. 20, 2013 (Anderson);
U.S. patent application Ser. No. 13/780,158 for a Distraction Avoidance System, filed Feb. 28, 2013 (Sauerwein);
U.S. patent application Ser. No. 13/780,196 for Android Bound Service Camera Initialization, filed Feb. 28, 2013 (Todeschini et al.);
U.S. patent application Ser. No. 13/780,271 for a Vehicle Computer System with Transparent Display, filed Feb. 28, 2013 (Fitch et al.);
U.S. patent application Ser. No. 13/780,356 for a Mobile Device Having Object-Identification Interface, filed Feb. 28, 2013 (Samek et al.);
U.S. patent application Ser. No. 13/784,933 for an Integrated Dimensioning and Weighing System, filed Mar. 5, 2013 (McCloskey et al.);
U.S. patent application Ser. No. 13/785,177 for a Dimensioning System, filed Mar. 5, 2013 (McCloskey et al.);
U.S. patent application Ser. No. 13/792,322 for a Replaceable Connector, filed Mar. 11, 2013 (Skvoretz);
U.S. patent application Ser. No. 13/852,097 for a System and Method for Capturing and Preserving Vehicle Event Data, filed Mar. 28, 2013 (Barker et al.);
U.S. patent application Ser. No. 13/895,846 for a Method of Programming a Symbol Reading System, filed Apr. 10, 2013 (Corcoran);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 13/933,415 for an Electronic Device Case, filed Jul. 2, 2013 (London et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 13/974,374 for Authenticating Parcel Consignees with Indicia Decoding Devices, filed Aug. 23, 2013 (Ye et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 14/047,896 for Terminal Having Illumination and Exposure Control filed Oct. 7, 2013 (Jovanovski et al.);
U.S. patent application Ser. No. 14/035,474 for Augmented-Reality Signature Capture, filed Sep. 24, 2013 (Todeschini);
U.S. patent application Ser. No. 14/050,515 for Hybrid-Type Bioptical, filed Oct. 10, 2013 (Edmonds et al.);
U.S. patent application Ser. No. 14/053,175 for Imaging Apparatus Having Imaging Assembly, filed Oct. 14, 2013 (Barber) U.S. patent application Ser. No. 14/055,234 for Dimensioning System, filed Oct. 16, 2013 (Fletcher);
U.S. patent application Ser. No. 14/055,353 for Dimensioning System, filed Oct. 16, 2013 (Giordano et al.);
U.S. patent application Ser. No. 14/055,383 for Dimensioning System, filed Oct. 16, 2013 (Li et al.);
U.S. patent application Ser. No. 14/053,314 for Indicia Reader, filed Oct. 14, 2013 (Huck);

U.S. patent application Ser. No. 14/058,762 for Terminal Including Imaging Assembly, filed Oct. 21, 2013 (Gomez et al.);

U.S. patent application Ser. No. 14/062,239 for Chip on Board Based Highly Integrated Imager, filed Oct. 24, 2013 (Toa et al.);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/082,468 for Encoded Information Reading Terminal with Wireless Path Selection Capability, filed Nov. 18, 2013 (Wang et al.);

U.S. patent application Ser. No. 14/087,190 for Optimal Range Indicators for Bar Code Validation, filed Nov. 22, 2013 (Hejl);

U.S. patent application Ser. No. 14/093,484 for System for Capturing a Document in an Image Signal, filed Dec. 1, 2013 (Showering);

U.S. patent application Ser. No. 14/093,487 for Method and System Operative to Process Color Image Data, filed Dec. 1, 2013 (Li et al.);

U.S. patent application Ser. No. 14/093,490 for Imaging Terminal Having Image Sensor and Lens Assembly, filed Dec. 1, 2013 (Havens et al.);

U.S. patent application Ser. No. 14/093,624 for Apparatus Operative for Capture of Image Data, filed Dec. 2, 2013 (Havens et al.);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/107,048 for Roaming Encoded Information Reading Terminal, filed Dec. 16, 2013 (Wang et al.);

U.S. patent application Ser. No. 14/118,400 for Indicia Decoding Device with Security Lock, filed Nov. 18, 2013 (Liu);

U.S. patent application Ser. No. 14/138,206 for System and Method to Store and Retrieve Identifier Associated Information, filed Dec. 23, 2013 (Gomez et al.);

U.S. patent application Ser. No. 14/143,399 for Device Management Using Virtual Interfaces, filed Dec. 30, 2013 (Caballero);

U.S. patent application Ser. No. 14/147,992 for Decoding Utilizing Image Data, filed Jan. 6, 2014 (Meier et al.);

U.S. patent application Ser. No. 14/150,393 for Indicia-reader Having Unitary Construction Scanner, filed Jan. 8, 2014 (Colavito et al.);

U.S. patent application Ser. No. 14/153,111 for Indicia Reading Terminal Including Frame Quality Evaluation Processing, filed Jan. 13, 2014 (Wang et al.);

U.S. patent application Ser. No. 14/153,142 for Imaging Apparatus Comprising Image Sensor Array having Shared Global Shutter Circuitry, filed Jan. 13, 2014 (Wang);

U.S. patent application Ser. No. 14/153,182 for System and Method to Manipulate an Image, filed Jan. 13, 2014 (Longacre et al.);

U.S. patent application Ser. No. 14/153,213 for Apparatus Comprising Image Sensor Array and Illumination Control, filed Jan. 13, 2014 (Ding);

U.S. patent application Ser. No. 14/153,249 for Terminal Operative for Storing Frame of Image Data, filed Jan. 13, 2014 (Winegar);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Lui et al.); and U.S. patent application Ser. No. 14/345,735 for Optical Indicia Reading Terminal with Combined Illumination filed Mar. 19, 2014 (Ouyang).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A focusing-module lens, comprising:

an aperture stop;

two adjustable surfaces, wherein the optical power of the adjustable surfaces is controlled electronically to achieve focus;

a first transparent deformable membrane having a ring-shaped piezoelectric film contiguously positioned on the first transparent deformable membrane's outer surface;

a second transparent deformable membrane having a ring-shaped piezoelectric film contiguously positioned on the second transparent deformable membrane's outer surface; and a flexible polymer contiguously positioned between the first transparent deformable membrane and the second transparent deformable membrane, whereby the flexible polymer is in contact with the respective inner surfaces of the first transparent deformable membrane and the second transparent deformable membrane.

2. The focusing-module lens according to claim 1, wherein the focusing-module lens has a clear aperture with a diameter of between 1.3 millimeters and 1.7 millimeters.

3. The focusing-module lens according to claim 1, wherein the first transparent deformable membrane and the second transparent deformable membrane transparent each comprise glass, quartz, or sapphire.

4. The focusing-module lens according to claim 1, wherein the focusing-module lens has a focusing response time of 2 milliseconds or less.

5. The focusing-module lens according to claim 1, wherein the focusing-module lens consumes 20 milliwatts or less.

6. A lens system, comprising:
a first positive lens group including a plurality of lenses fixedly positioned along an optical axis;
a second positive lens group including a plurality of lenses fixedly positioned along the optical axis;
a focusing-module lens fixedly positioned along the optical axis between the first positive lens group and the second positive lens group and formed from at least one adjustable surface whose optical power is electronically controlled to achieve focus, wherein the focusing-module lens (i) defines an aperture stop for the lens system and (ii) has a clear aperture whose diameter is smaller than the diameter of either the first lens group or the second lens group.

7. The lens system according to claim 6, wherein focusing-module lens comprises exactly two adjustable surfaces electronically controlled independently of one another.

8. The lens system according to claim 6, wherein the focusing-module lens consists of two adjustable-surface lenses positioned back-to-back.

9. The lens system according to claim 6, wherein the lens system has an f-number of 6 or less.

10. The lens system according to claim 6, wherein the lens system has a working distance of 10 centimeters or greater.

11. The lens system according to claim 6, wherein the focusing-module lens has a focusing response time of 2 milliseconds or less.

12. A system, comprising:
a lens system, comprising (i) a first positive lens fixedly positioned along an optical axis, (ii) a second positive lens fixedly positioned along the optical axis, and (iii) a focusing-module lens fixedly positioned along the optical axis between the first positive lens and the second positive lens and formed from at least one adjustable surface, wherein the optical power of the at least one adjustable surface is controlled electronically to achieve focus of a real image of an indicia;
a range finder for sensing the range of an indicia through transmitted and received radiation and for creating a range signal representing the sensed range;
a lookup table stored in memory, the lookup table containing focus settings associated with range-signal values;
a processor for running a process that compares the range signal with the lookup table in order to generate a corresponding control signal; and
a controller for reading the control signal and for outputting electronic autofocus signals to adjust the lens system.

13. The system according to claim 12, wherein the focusing-module lens has a clear aperture whose diameter is smaller than the diameter of either the first positive lens or the second positive lens, the focusing-module lens defining an aperture stop for the lens system.

14. The system according to claim 12, wherein the first lens is a lens group comprising a plurality of lenses.

15. The system according to claim 12, wherein the second lens is a lens group comprising a plurality of lenses.

16. The system according to claim 12, wherein the first positive lens and the second positive lens each comprise a lens group comprising a plurality of lenses.

17. The system according to claim 12, wherein the focusing-module lens consists of two adjustable-surface lenses positioned in close proximity to one another.

18. The system according to claim 12, wherein the focusing-module lens comprises (i) a first glass membrane having a ring-shaped piezoelectric film contiguously positioned on the first glass membrane's outer surface, (ii) a second glass membrane having a ring-shaped piezoelectric film contiguously positioned on the second glass membrane's outer surface, and (iii) a flexible polymer contiguously positioned between the first glass membrane and the second glass membrane, whereby the flexible polymer is in contact with the respective inner surfaces of the first glass membrane and the second glass membrane.

19. The system according to claim 12, wherein the lens system has a working distance of 10 centimeters or greater.

20. The system according to claim 12, wherein the focusing-module lens consumes 20 milliwatts or less.

* * * * *